United States Patent
Knighton

(10) Patent No.: US 9,156,204 B2
(45) Date of Patent: Oct. 13, 2015

(54) HYBRID SCANNER FABRICATOR

(75) Inventor: Mark S. Knighton, Santa Monica, CA (US)

(73) Assignee: Synerdyne Corporation, Santa Monica, CA (US)

(*) Notice: Subject to any disclaimer, the term of this patent is extended or adjusted under 35 U.S.C. 154(b) by 249 days.

(21) Appl. No.: 12/781,312

(22) Filed: May 17, 2010

(65) Prior Publication Data

US 2011/0282482 A1  Nov. 17, 2011

(51) Int. Cl.
| | |
|---|---|
| B05C 19/00 | (2006.01) |
| B05B 7/06 | (2006.01) |
| B05C 11/10 | (2006.01) |
| B29C 67/00 | (2006.01) |

(52) U.S. Cl.
CPC .................. B29C 67/0055 (2013.01)

(58) Field of Classification Search
USPC ......... 118/308, 309, 313–315, 666, 667, 712, 118/713, 665, 697, 698; 425/375, 135, 145, 425/162, 166, 150, 131.1, 60
See application file for complete search history.

(56) References Cited

U.S. PATENT DOCUMENTS

| | | | |
|---|---|---|---|
| 3,013,925 A | 12/1961 | Larsen | |
| 4,589,830 A | 5/1986 | Clawson | |
| 4,752,352 A | 6/1988 | Feygin | |
| 5,260,009 A | 11/1993 | Penn | |
| 5,303,141 A | 4/1994 | Batchelder et al. | |
| 5,398,193 A * | 3/1995 | deAngelis | 700/119 |
| 5,402,351 A | 3/1995 | Batchelder et al. | |
| 5,514,232 A | 5/1996 | Burns | |
| 5,683,561 A | 11/1997 | Hollars et al. | |
| 5,694,324 A | 12/1997 | Masters et al. | |
| 5,730,925 A | 3/1998 | Mattes et al. | |
| 5,740,051 A | 4/1998 | Sanders et al. | |
| 5,879,489 A | 3/1999 | Burns et al. | |
| 5,993,554 A * | 11/1999 | Keicher et al. | 118/641 |
| 6,309,581 B1 | 10/2001 | Gervasi | |
| 6,391,251 B1 * | 5/2002 | Keicher et al. | 419/7 |
| 6,405,095 B1 * | 6/2002 | Jang et al. | 700/118 |
| 6,575,218 B1 | 6/2003 | Burns et al. | |
| 6,627,835 B1 | 9/2003 | Chung et al. | |
| 6,629,011 B1 * | 9/2003 | Calderon et al. | 700/119 |
| 6,764,636 B1 | 7/2004 | Allanic et al. | |
| 6,841,116 B2 | 1/2005 | Schmidt | |
| 6,896,839 B2 | 5/2005 | Kubo et al. | |

(Continued)

FOREIGN PATENT DOCUMENTS

| | | |
|---|---|---|
| EP | 1262305 | 6/2006 |
| JP | 2001-270096 | 10/2001 |

OTHER PUBLICATIONS

Synerdyne Corporation, PCT Search Report and Written Opinion mailed Feb. 8, 2012; PCT/US2011/035260.

(Continued)

*Primary Examiner* — Yewebdar Tadesse
(74) *Attorney, Agent, or Firm* — Blakely Sokoloff Taylor & Zafman LLP

(57) ABSTRACT

A system and method to fabricate three dimensional objects. A set of fabrication tools include at least a coarse deposition head and a fine additive head, a fine subtractive head or both employed concurrently within a single housing. A scanner may also be used within the housing to perform interleaved scanning of the partial fabrication during the fabrication. The process may be adjusted based on the scan results.

7 Claims, 4 Drawing Sheets

(56) References Cited

U.S. PATENT DOCUMENTS

| | | |
|---|---|---|
| 7,004,222 B2 | 2/2006 | Ederer et al. |
| 7,033,160 B2 | 4/2006 | Fong |
| 7,037,382 B2 | 5/2006 | Davidson |
| 7,125,512 B2 | 10/2006 | Crump et al. |
| 7,168,935 B1 | 1/2007 | Taminger et al. |
| 7,291,002 B2 | 11/2007 | Russell et al. |
| 7,300,619 B2 | 11/2007 | Napadensky et al. |
| 7,597,835 B2 | 10/2009 | Marsac |
| 7,879,393 B2 | 2/2011 | Ederer et al. |
| 8,246,888 B2 | 8/2012 | Hopkins et al. |
| 2001/0017085 A1 | 8/2001 | Kubo et al. |
| 2001/0019340 A1* | 9/2001 | Kubo et al. ............... 347/1 |
| 2001/0050448 A1 | 12/2001 | Kubo et al. |
| 2002/0029094 A1* | 3/2002 | Koreishi ............... 700/197 |
| 2002/0145213 A1* | 10/2002 | Liu et al. ............... 264/40.1 |
| 2003/0090034 A1 | 5/2003 | Mulhaupt et al. |
| 2004/0170765 A1 | 9/2004 | Ederer et al. |
| 2004/0175451 A1* | 9/2004 | Maekawa et al. ............ 425/144 |
| 2005/0001356 A1 | 1/2005 | Tochimoto et al. |
| 2005/0167038 A1 | 8/2005 | Torris et al. |
| 2006/0105102 A1 | 5/2006 | Hochsmann et al. |
| 2006/0225834 A1 | 10/2006 | Medina et al. |
| 2007/0077323 A1 | 4/2007 | Stonesmith et al. |
| 2007/0126157 A1 | 6/2007 | Bredt |
| 2009/0020901 A1 | 1/2009 | Schillen et al. |
| 2009/0177309 A1 | 7/2009 | Kozlak |
| 2010/0127433 A1 | 5/2010 | Medina et al. |
| 2010/0140852 A1 | 6/2010 | Kritchman et al. |
| 2010/0161105 A1 | 6/2010 | Blake |
| 2011/0101569 A1 | 5/2011 | Yasukochi |
| 2012/0281239 A1 | 11/2012 | White et al. |
| 2013/0334740 A9 | 12/2013 | Jamar et al. |
| 2014/0027953 A1 | 1/2014 | Costabeber |
| 2014/0048981 A1 | 2/2014 | Crump et al. |
| 2014/0191442 A1 | 7/2014 | Elsey |

OTHER PUBLICATIONS

Synerdyne Corporation, et al., PCT Search Report mailed Apr. 9, 2012; PCT/US2011/051835.

Synerdyne Corporation, et al., PCT Search Report mailed Apr. 9, 2012; PCT/US2011/051838.

Synerdyne Corporation, et al., PCT Search Report mailed Apr. 9, 2012; PCT/US2011/051839.

Synerdyne Corporation, International Preliminary Report on Patentability, International Appln No. PCT/US2011/051835 mailed Mar. 28, 2013.

Synerdyne Corporation, International Preliminary Report on Patentability, International Appln No. PCT/US2011/051838, mailed Mar. 28, 2013.

Synerdyne Corporation, International Preliminary Report on Patentability, International Appln No. PCT/US2011/051839, mailed Mar. 28, 2013.

Notice of Allowance, U.S. Appl. No. 12/884,982, dated Jul. 30, 2014, 9 pages.

* cited by examiner

HYBRID SCANNER FABRICATOR

FIELD

The invention relates to a method and apparatus for fabricating three dimensional objects. More specifically, embodiments of the invention relate to a hybrid applicator having coarse and fine fabrication capabilities and, in some cases, interleaved scanning.

BACKGROUND

Various three dimensional printers exist which can be used to fabricate a three dimensional object from a digital model. Typically, such printers spray down a series of fine dots of a plastic material perpendicularly to a build surface. The dot size is selected to permit creation of the minimum feature size desired. As a result, when larger than the minimum feature size is desired, many more dots must be accumulated to create the feature. Additionally, a sacrificial material must be used to support any features that are not perpendicularly supported by the build surface. As a result, the build process tends to be quite slow.

Other existing three dimensional fabrication systems employ a gel, which is extruded and cured to form a three dimensional object. However, this system has many of issues described above and additionally suffers from sagging and deformation during cure.

Additionally, anomalies or inconsistencies within the build process cannot be identified, while the process is occurring. Thus, it is only after the time is consumed for the complete fabrication that the finished product may reveal the build was unsuccessful. Thus, an entire additional build process must be undertaken to create a new object. A more reliable and faster apparatus and system for forming three dimensional objects from a digital representation is desirable.

BRIEF DESCRIPTION OF THE DRAWINGS

The embodiments of the invention are illustrated by way of example and not by way of limitation in the figures of the accompanying drawings in which like references indicate similar elements. It should be noted that references to an embodiment of the invention in this disclosure are not necessarily to the same embodiment, and they mean at least one.

DETAILED DESCRIPTION

Figure 1:
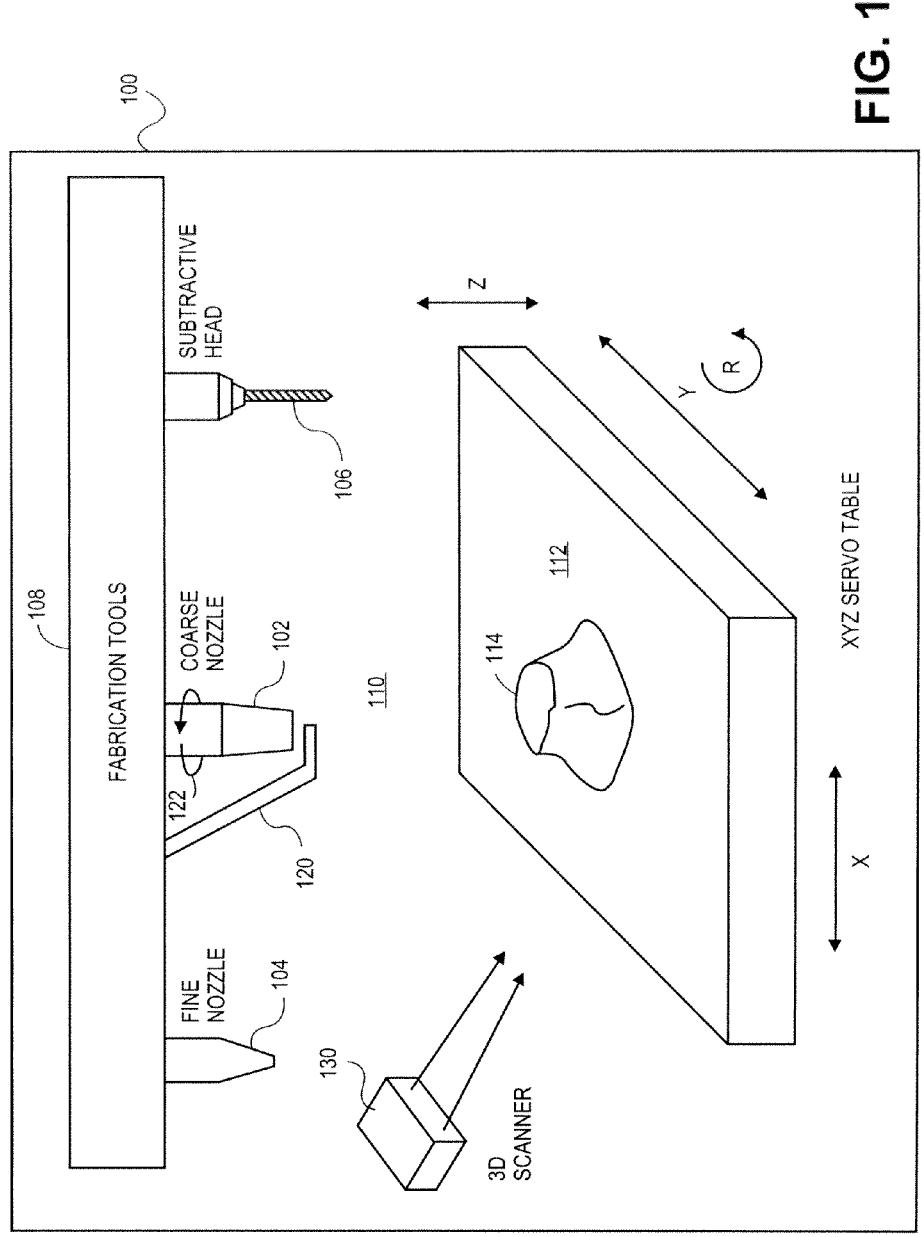
FIG. 1 is a schematic diagram of a system of one embodiment of the invention.

FIG. 1 is a schematic diagram of a system of one embodiment of the invention. Within the housing 100, a plurality of fabrication tools 108 is disposed. Fabrication tools 108 may be disposed as a single head or individual independently moveable heads. In one embodiment, a coarse print nozzle 102 is provided to deposit a fabrication material within a work space 110 at a granularity of greater than 0.030 square inches per deposition. As used herein, granularity greater than x means that each deposition occupies an area greater than x. A work surface (also referred to as a build surface) 112 provides a support for the fabrication of a three dimensional target object 114. In one embodiment, a plurality of servos move the work surface 112 relative to the fabrication tools 108 in x, y, z and rotational directions responsive to computer control.

In some embodiments, because the coarse nozzle 102 may deposit volumes of material that will not cool quickly enough under ambient conditions, an active cooling arm 120 may be used to provide active localized cooling to material deposit by coarse nozzle 102. In some embodiments, coarse nozzle 102 may also be oriented to a different angular orientations 122 relative to the work surface 112. This is discussed in more detail with reference to FIG. 4 below. In some embodiments the cross section of the nozzle 102 may also be changed so that a single deposition may have a different shape than a subsequent or prior deposition.

In some embodiments, also included within the fabrication tools 108 is a fine nozzle 104 to deposit smaller amounts of material than the coarse nozzle. This permits detailing of an object created by the coarse nozzle 102 so that large features can be rapidly built with the coarse nozzle 102 and small features added with the fine nozzle 104. In one embodiment, fine nozzle 104 deposits material with granularity less than 0.015 square inches per deposition. As used herein, a granularity of less than x means a deposited spot occupies an area less than x. Also included within the fabrication tools 108, in one embodiment of the invention, is a subtractive head 106, which can subtractively detail the object 114. In one embodiment, subtractive head 106 is a computer controlled milling bit. In some embodiments, performing the subtractive detailing before addition of a subsequent layer, access to detail desired features can be assured.

In one embodiment of the invention, a three dimensional scanner 130 is provided within the housing 100 to scan the object 114 during fabrication. This permits the fabrication process to be adjusted responsive to identification of variance in the fabricated object 114 from the intended object as reflected in the digital model sourcing the data for the fabrication. In some embodiments, a scanner 130 may use laser ranging to create the three dimensional model of the work in process 114. Other scanning methods are also within the scope and contemplation of the invention.

In some embodiments, the intermediate scanned model may be analyzed to determine whether corrective measures may be deferred until later in the fabrication process where such deferral would improve the efficiency of the fabrication. For example, if detailing with fine nozzle 104 may be deferred because it will still be possible to create that detail at a later point, then the analysis from the intermediate scan may cause the deferral of that detailing. However, where that aspect may or will no longer be accessible after further fabrication steps, the corrective action or detailing action must be taken before such subsequent fabrication actions obscure the area to be detailed.

In some embodiments, such as shown in FIG. 1, the fabrication tools 108 and scanner 130 remain fixed and the work surface 112 is moved to effect the relative motion between the point object and the tool 108 and scanner 130. In other embodiments, the tools 108 and scanning 130 move more while the target object remains fixed. Additionally, while and embodiment with a coarse nozzle and a fine nozzle is described and shown, a system employing a range of multiple nozzles is within the contemplation of the invention.

Figure 2:
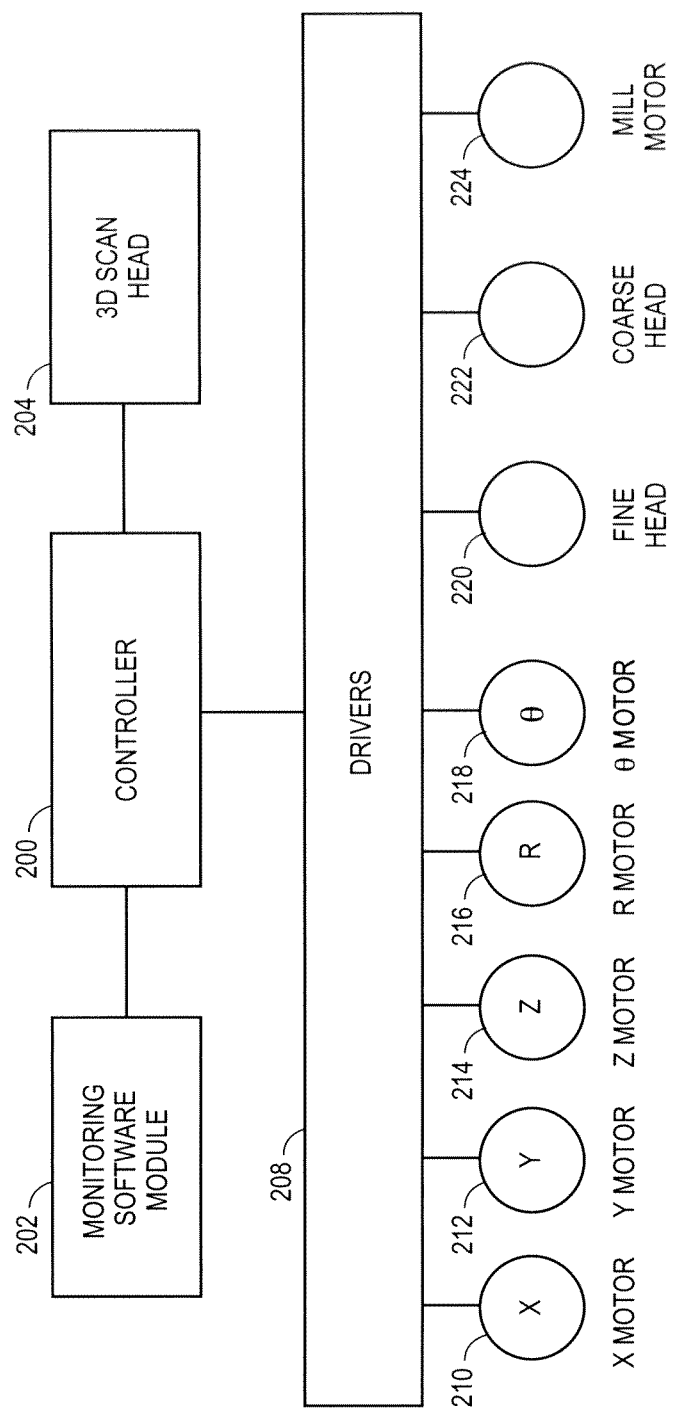
FIG. 2 is a schematic diagram of a control subsystem for one embodiment of the invention.

FIG. 2 is a schematic diagram of a control subsystem for one embodiment of the invention. A controller 200 interacts with a plurality of drivers 208, a three dimensional scan head 204, and monitoring software 202. Controller 200 uses a digital model of an object to be fabricated to instruct the drivers 208.

During fabrication controller 200 may periodically initiate a scan of the partial object using scan head 204. The resulting scan data may be provided to the monitoring software module 202, which may conduct an analysis. For example, monitoring software module 202 may perform comparison of existing source model relative to what has been built in the partial object. The comparison may reflect a need to modify one or more aspects of the build, or do additional additive or subtractive detailing. An evaluation may also be undertaken to determine whether such additional detailing may be deferred. The deferral of the detailing should be undertaken where such deferral makes where such deferral makes the overall fabrication more efficient. For example, where deferral of detailing reduces the number of movements the object must undergo in the process. Deferral should generally not be undertaken when there is no efficiency gain or where it may or will not be possible to perform detailing at a later point during the process. Drivers 208 include servo drivers to drive notions 210, 212, 214, and 216 to drive the relative motion between the work surface (112 in FIG. 1) and the fabrication tools (108 in FIG. 1). As shown, motor 210 controls x motor, motor 212 controls y motion, motor 214 controls z motor and motor 216 controls rotation. An additional driver drives motor 218, which controls the orientation and cross section of the coarse nozzle. Additionally drivers 208 to include drivers to drive fine head deposition 220 coarse deposition 222 and the mill motor 224.

Figure 3:
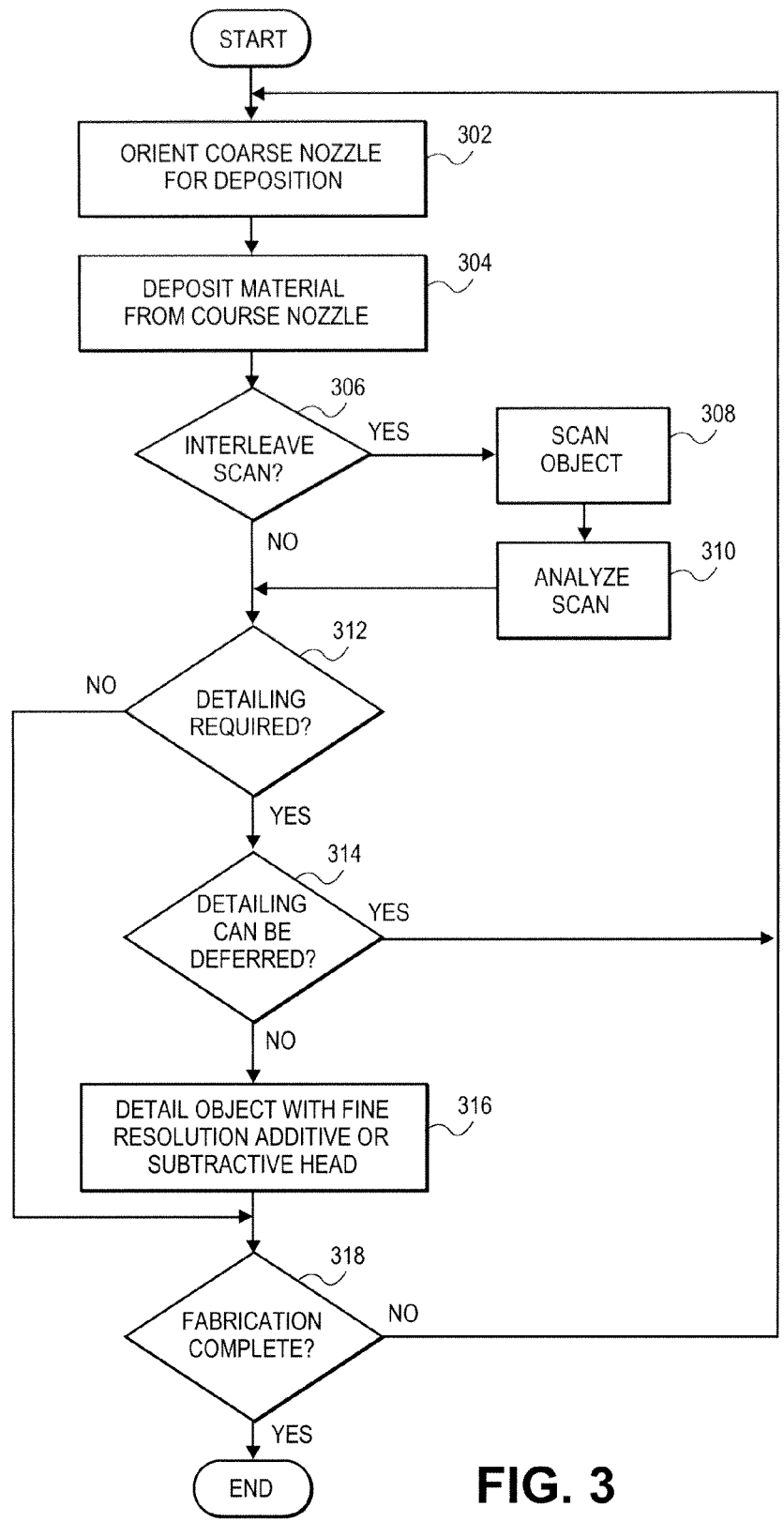
FIG. 3 is a flow diagram of operation according to one embodiment of the invention.
Figure 4:
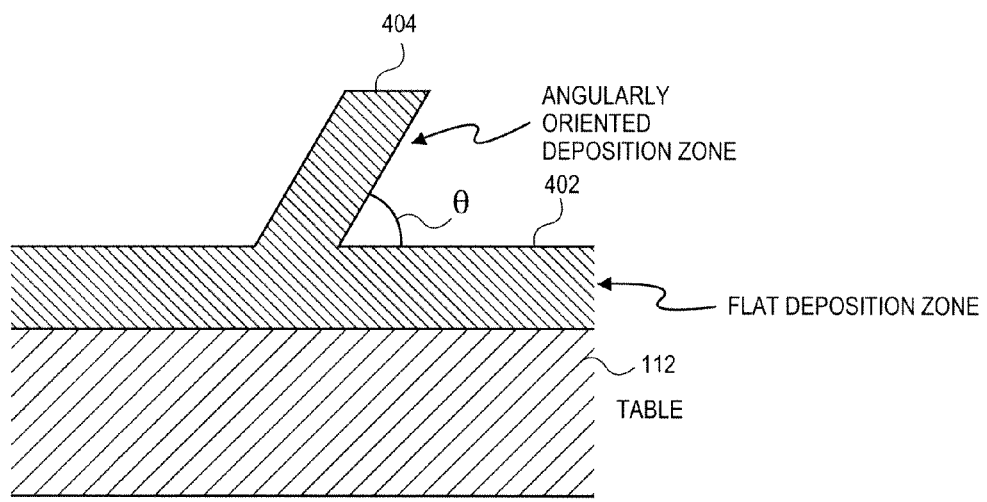
FIG. 4 is a schematic diagram showing oriented deposition according to one embodiment of the invention.

FIG. 3 is a flow diagram of operation according to one embodiment of the invention. At block 302, the coarse nozzle is oriented for desired angular deposition relative to the underlying material. In some cases, the model nozzle may deposit perpendicularly achieving a flat deposition zone 302 as shown in FIG. 4. In other cases, the nozzle may be oriented to deposit an angle θ relative to the perpendicular to achieve an angular deposition zone 404 in FIG. 4.

At block 304, the system drives the coarse nozzle to deposit material in the orientation selected at block 302. At decision block 306, a determination is made whether a scan should be interleaved at this point in the fabrication process. If a scan should be interleaved the object is scanned at block 308 and the three dimensional model of the partial object is created. At block 310, the scan of the partial object is analyzed relative to, for example, the model on which the fabrication is based to evaluate if changes should be made to the fabrication process concurrently.

For example, variations between the intended design reflected in the source model and what has actually been created may necessitate additional detailing or changes in the calibration of the system. Additionally, determinations can be made whether detailing can be deferred to the extent that such deferral will improve the efficiency of the fabrication process by, for example, reducing the number of the relative movement of the fabrication heads and the object.

A determination is made at decision block 312 whether detailing is required. f detailing is required at decision block 314, a determination is made whether to what extent the detailing can be deferred. If the detailing is required and cannot be deferred, the object detailed with the fine resolution additive or subtractive head at block 316. If no detailing is required or after the detailing is complete at block 316, the decision is made at decision block 318 where the fabrication is complete. If the fabrication is not complete, the system returns for further deposition. Otherwise the process ends.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A three dimensional printing apparatus comprising:
   a structure defining a work area;
   an interface to receive digital data defining a geometry for a three-dimensional object to be fabricated;
   at least two different additive nozzles that deposit different volumes of material per unit of time at each nozzle's spot of deposition, one nozzle depositing at least twice as much as the other, the two nozzles including:
   a coarse additive nozzle that deposits a larger volume of material per unit of time within the work area;
   a fine additive nozzle that deposits a smaller volume of material per unit of time at a spot within the work area; and
   a controller configured to select between the coarse additive nozzle and the fine additive nozzle during a build process based on the digital data defining the geometry, to cause large features internal to the three-dimensional object to be built with the coarse additive nozzle more rapidly than is possible with the fine additive nozzle.

2. The three dimensional printing apparatus of claim 1 wherein the fine additive nozzle comprises a nozzle having a spot deposit granularity less than 0.015 square inches at a point of deposition.

3. The three dimensional printing apparatus of claim 1 wherein the coarse additive nozzle has a spot deposit granularity greater than 0.030 square inches at a point of deposition.

4. The three dimensional printing apparatus of claim 1 further comprising:
   temperature control subsystem to actively cool a portion of the deposit of material more rapidly than an intrinsic cooling rate of the material.

5. The three dimensional printing apparatus of claim 1 further comprising:
   a three dimensional scanner coupled to the structure to capture three dimensional data about the three-dimensional object being fabricated; and
   a control subsystem that monitors scan head data and controls the coarse additive fine additive nozzles to adjust a fabrication process to improve at least one of the speed or accuracy of a fabrication of the three-dimensional object.

6. A three dimensional printing apparatus comprising:
a structure defining a work area;
an interface to receive digital data defining a geometry for a three-dimensional object to be fabricated;
a coarse nozzle to deposit material at a coarse granularity within the work area; and
at least one of a fine granularity additive nozzle or a fine granularity subtractive head to detail the material deposited by the coarse nozzle; and
a control subsystem that includes a software module configured to determine whether access to detail will be possible after a subsequent layer of material is deposited, and whether the fabrication of the three-dimensional object will be more efficient per unit of time when the detailing is deferred to a point of later time in the fabrication.

7. The three dimensional printing apparatus of claim 6 wherein the subtractive mechanism comprises:
a computer-controlled milling bit.

* * * * *